(12) United States Patent
Chiroglazov et al.

(10) Patent No.: US 7,546,360 B2
(45) Date of Patent: Jun. 9, 2009

(54) ISOLATED WORKING CHAMBER ASSOCIATED WITH A SECURE INTER-COMPANY COLLABORATION ENVIRONMENT

(75) Inventors: Anatoli G. Chiroglazov, Cupertino, CA (US); Lawrence A. Drenan, Cupertino, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1046 days.

(21) Appl. No.: 10/696,237

(22) Filed: Oct. 28, 2003

(65) Prior Publication Data

US 2004/0093397 A1      May 13, 2004

Related U.S. Application Data

(63) Continuation-in-part of application No. 10/164,831, filed on Jun. 6, 2002, now Pat. No. 7,143,136.

(51) Int. Cl.
*G06F 15/173* (2006.01)

(52) U.S. Cl. .......................... 709/223; 709/226; 705/6; 707/10; 711/170; 711/173

(58) Field of Classification Search ................ 709/223, 709/226; 705/6; 707/10, 206; 711/170, 711/173
See application file for complete search history.

(56) References Cited

U.S. PATENT DOCUMENTS

| | | | |
|---|---|---|---|
| 6,055,575 A | 4/2000 | Paulson et al. | |
| 6,507,845 B1 | 1/2003 | Cohen et al. | ................ 707/100 |
| 6,598,074 B1 | 7/2003 | Moller et al. | ............... 709/204 |
| 6,697,846 B1 | 2/2004 | Soltis | |
| 6,718,218 B1 | 4/2004 | Matheson | .................... 700/95 |
| 6,741,265 B2 | 5/2004 | Ghosh et al. | |
| 6,757,289 B1 | 6/2004 | Cain et al. | |

(Continued)

OTHER PUBLICATIONS

Fuchs, Ludwin et al., "Enabling Inter-Company Team Collaboration," proceedings of the IEEE 10$^{th}$ Intl. Workshop on Enabling Technologies Infrastructures for Collaborative Enterprises, Jun. 20-22, 2001, pp. 374-379.

(Continued)

*Primary Examiner*—Thanh Tammy Nguyen
(74) *Attorney, Agent, or Firm*—Hickman Palermo Truong & Becker LLP

(57) ABSTRACT

A system is described in which multiple companies can securely collaborate on a design or other project, while one company can still protect certain property, such as source code, from the other collaborating companies. The system includes an inter-company collaboration system that includes a set of resources residing on a set of one or more first utility servers maintained by a first company, an access control mechanism for controlling access to the set of resources, a first data storage mechanism, and a secure network connection between the set of utility servers and a second company. The system further includes an isolated system that includes a second set of servers, a second data storage mechanism that includes a first portion that contains data shared with the collaboration system and a second portion that contains data private to the isolated system, and a second access control mechanism to control access to the second set of servers to only individuals associated with one company.

11 Claims, 10 Drawing Sheets

U.S. PATENT DOCUMENTS

| | | | |
|---|---|---|---|
| 6,952,660 B1 | 10/2005 | Matheson | 703/1 |
| 2003/0018719 A1 | 1/2003 | Ruths et al. | 709/205 |
| 2003/0074606 A1 | 4/2003 | Boker | 714/42 |
| 2004/0186762 A1 | 9/2004 | Beaven et al. | 705/8 |
| 2004/0221010 A1 | 11/2004 | Butler | |

OTHER PUBLICATIONS

Morrison, David et al., "Lotus Sametime 2.0 Deployment Guide," IBM Corp., 2001, pp. 1-175.

Lloyd, B. et al., "PPP Authentication Protocols," Internet Society, Network Working Group, RFC 1334, Oct. 1992, pp. 9-16.

Zorn, G., "Microsoft PPPCHAP Extensions, Version 2.0," Internet Society, Network Working Group, RFC 2759, Jan. 2000, pp. 1-20.

Author unknown, "DInCAD: Distributed Internet-based CAD Methods for Future Complex Microelectronic Systems," downloaded Nov. 25, 2002, 8 pages.

Author unknown, "Cave," downloaded Nov. 25, 2002, 5 pages.

Author unknown, "Cave; Cave Project," downloaded Nov. 25, 2002, 14 pages.

Leandro Soares Indrusiak, et al., "A Case Study for a WWW Based CAD Framework," downloaded Nov. 25, 2002, 4 pages.

Leandro Soares Indrusiak, et al., "Distributed Collaborative Design over Cave2 Framework," downloaded Nov. 25, 2002, 6 pages.

Leandro Soares Indrusiak, "Architectural Evolution for the Cave Design Automation Framework," Sep. 2000, pp. 1-46.

Synopsys, Inc., "Synopsys and Avant! Lead Internet-Based Design Revolution," Jun. 1, 2000, 4 pages.

Author unknown, The silicon system, "system on a chip: the executive perspective, Internet-Based Electronic Design Comes of Age," interview of David Burow, autumn 2000, pp. 9-13.

Synopsys, Inc., "TSMC joins with Synopsys and Avant! to Deliver New RTL to Silicon Flow on Designsphere Access," Oct. 12, 2000, 3 pages.

John Cooley, "A mutating DesignSphere," EE Times, Jul. 2, 2001, 3 pages.

ChipCenter-QuestLink, "Synopsys and Avant! Launch Internet Service," Jun. 1, 2000, 4 pages.

ChipCenter-QuestLink, "Cadence Unveils Internet Strategy," Mar. 27, 2000, 5 pages.

ChipCenter-QuestLink, "Aptix Initiates Internet Service," 2002, downloaded Nov. 25, 2002, 2 pages.

ChipCenter-QuestLink, "Toolwire Moves on Internet-Based Design, SunMicrosystems, Lucent, Synopsys, and Avnent Team with Internet Startup, Toolwire, To Deliver New Approach for B2B Engineering Collaboration," 2002, downloaded Nov. 25, 2002, 5 pages.

Toolwire, Inc., "Toolwire, Company Overview," 2002, downloaded Nov. 25, 2002, 2 pages.

Synopsys, Inc., "Synopsys' FPGA *Express* Now Available On The Internet From Toolwire, Inc.," Feb. 24, 2000, 3 pages.

Richard Goering, "Toolwire bids to unite electronics design chain," EE Times, Apr. 17, 2000, 4 pages.

Phil Wainewright, "Toolwire Puts Electronics Design Online," internetnews.com, Apr. 18, 2000, 3 pages.

Kevin Newcomb, "Toolwire Manages the Design Chain," internetnews.com, Sep. 25, 2000, 3 pages.

Sun Microsystems, Inc., "Sun Technology. com's the EDA Market, Innovative Products and Technologies Enable Network-Based Design Automation Applications," May 30, 2000, 5 pages.

Michael Santarini, et al., "Web-based EDA tools find limited acceptance," EE Times, Apr. 18, 2001, 4 pages.

WebEx Communications, Inc., "WebEx Meeting Center—Web Conferencing for Business Communications," 2002, downloaded Nov. 25, 2002, 3 pages.

WebEx Communications, Inc., "WebEx Global Network Business Communications and Collaboration Overview," 2002, downloaded Nov. 25, 2002, 2 pages.

PlaceWare®, "Features & Functionality," 2002, downloaded Nov. 25, 2002, 1 page.

SonicWALL, "What is VPN?," 2002, downloaded Nov. 25, 2002, 3 pages.

Oridus™, "SpaceCruiser Server Infrastructure for Design Communication," 2002, downloaded Nov. 25, 2002, 3 pages.

Oridus™, "Cadence and CreOsys Announce Joint Development of Web-based Collaborative Design Products Companies Pursue Next-Generation Security and Quality-of-Services," Mar. 21, 2002, 2 pages.

eSilicon Corporation, "eSilicon Access, The Semiconductor Industry's Most Comprehensive Online Supply Chain Mangement System," 2002, downloaded Nov. 25, 2002, 3 pages.

IBM, "e-business offerings," downloaded Nov. 25, 2002, 1 page.

Author unknown, "Addressing Security with pcAnywhere," downloaded Nov. 25, 2002, 4 pages.

Symantec Corporation, Symantec Enterprise Administration, "Synmantec pcAnywhere™ 10.5," 2001, 4 pages.

Citrix Systems, Inc., "Citrix® MetaFrame® for UNIX with Feature Release 1," 2001, 4 pages.

Mike Bursell, et al., "Citrix MetaFrame for UNIX® Operating Systems and ICA: Performance Characteristics," Citrix Systems, Inc., 2002, downloaded Nov. 25, 2002, 9 pages.

Citrix Systems, Inc., "Citrix Secure Gateway v1.1, Technical Presentation," May 2002, 19 pages.

ISOLATED WORKING CHAMBER ASSOCIATED WITH A SECURE INTER-COMPANY COLLABORATION ENVIRONMENT

CROSS REFERENCE TO RELATED APPLICATION

This is a continuation-in-part of U.S. patent application Ser. No. 10/164,831 filed on Jun. 6, 2002, now U.S. Pat. No. 7,143,136 which is incorporated by reference in its entirety for all purposes as if fully set forth herein.

FIELD OF THE INVENTION

The present invention relates generally to communications and, more specifically, to implementation of an isolated working chamber in association with a secure inter-company collaboration environment.

BACKGROUND OF THE INVENTION

Design and development projects naturally require a certain degree of collaboration among the projects' participants. Complex projects and projects in technological areas requiring high expertise, such as developing, maintaining and operating IC (integrated circuit) design environments or co-developing ICs, typically require a high degree of collaboration and communication. In cases in which more than one company work together on a project, the challenges are greater with respect to providing engineering teams with the efficiency of working together as if they are one company, while providing the security necessitated by the fact that they are not one company. For example, updating and maintaining a design environment has become more and more complex with diminishing feature sizes and the increase in the complexity of the designs. Therefore, it is desirable to provide a collaboration environment in which project participants (typically engineers) can interact, communicate, and design and develop their products, while also providing a secure environment in which each company's intranet and intellectual property are protected from the other company and in which project-specific information and intellectual property are protected from unauthorized individuals within any of the respective companies.

Previous collaboration approaches have united project teams via mail, teleconferencing, video conferencing, joint project plans, and frequent face-to-face meetings. Later innovations such as e-mail and file exchange protocols (e.g., file transport protocol, or FTP), have improved the immediacy of communication through use of networks, specifically the Internet. More recent advances, such as X Display in an X Window System, WebEx, and NetMeeting, utilize a cross-platform, client/server system for managing a windowed graphical user interface in a distributed network, thereby allowing someone to view someone else's desktop without physically traveling to the desktop site.

None of the foregoing approaches have approximated the efficiency that teams working together physically can achieve. For example, e-mail and FTP approaches are difficult to manage in view of the magnitude of common files associated with an IC engineering project, and are thus error-prone. Additionally, complex problems are difficult to address and solve through e-mail and FTP communication alone because the problems are often embedded in the design environments, which often differ from site to site and company to company. For another example, use of telnet technology allows one to run tools or applications on another site and to view text results, but does not support the graphical communication required in complex engineering projects. Remote viewing techniques do exist that can address the absence of graphical communication by allowing an offsite engineer to view the problem in its native context, but the majority of remote viewing techniques are run on operating systems not typically used in complex IC design projects.

Of course, co-location of engineering teams from different companies can provide the desired efficiencies, but it is often not feasible to co-locate personnel for geographical, cost, and logistical reasons. Furthermore, co-location incurs the problems of constraining the engineers to working only on the joint project and of isolating them from the rest of their organization.

Electronic design automation (EDA) software applications that are often used in the design of ICs, at times encounter errors when executing within a specific scenario with specific external data. Thus, the actual external data that caused the error is often needed to recreate the error in a separate instance of the application. Since debugging a software application is an iterative process, it is most productive for a debugger to have the application source code readily available for modification and creation of revised executables. However, source code is typically proprietary and highly guarded intellectual property, which owners do not want to share with other parties.

Based on the foregoing, it is clearly desirable to provide an environment in which multiple companies or parties can remotely collaborate on an engineering or other project. There is a further need to provide a secure collaboration environment in which the companies are able to restrict access to only certain information, and to restrict access to only certain people. There is another further need to provide an isolated working system or environment, in association with such a collaboration environment, in which one of the collaborating companies is able to use information that is only accessible to the one company and not accessible to any of the other collaborating companies.

SUMMARY OF EMBODIMENTS

A system is described which provides multiple companies with the ability to securely collaborate on a design or other project, while maintaining the security of their project and non-project resources. According to one aspect, the system includes a set of resources residing on a set of one or more utility servers maintained by a first company, an access control mechanism for controlling access to the set of resources, a secure network connection between the set of utility servers and a second company, and a remote controller for remotely viewing, by an authorized individual from the second company, a user interface of an application while an authorized individual from the first company is executing the application on the set of utility servers. In one embodiment, the user interface is a graphical user interface that displays a graphical representation, wherein the remote controller provides the capability to remotely view the graphical representation. In one embodiment, the remote controller is further configured to enable an authorized individual from the second company to remotely control execution of an application running on the set of utility servers.

According to one embodiment, the security of the secure network connection includes a secure association mechanism configured to establish a secure association between authorized individuals from the first and second companies. In another embodiment, the secure association mechanism includes a virtual point-to-point network connection which is established upon establishment of the secure association, whereby communication between the companies is limited to communication between specific devices that established the secure association; and an encryption/decryption mechanism for securing the data that is transmitted across the virtual point-to-point network connection. In yet another embodiment, the secure association is periodically renewed via an automated request and acknowledgement process.

In other embodiments, the set of resources include a file manager for managing data files shared among project participants, and a communication mechanism for managing messages posted by project participants.

According to one aspect, a secure inter-company collaboration system includes a first and second set of utility servers maintained at a first and second company, respectively, and first and second sets of resources residing on the respective utility servers. Thus, for example without limitation, specialists from one company who have developed a particular design tool and who thus have expertise in the use of the design tool, can securely collaborate with project participants from another company who are using the design tool, via the secure collaboration system. If configured appropriately, the system allows the design tool and other applications to execute on either company's servers, while providing personnel from the other company with the capability to view and control the tool in real-time.

According to one aspect, a system is described that includes an isolated system that is associated with an inter-company collaboration system. Such a system includes a collaboration system having (1) a first set of servers; (2) a first data storage mechanism associated with the first set of servers; (3) a set of resources; (4) a secure network connection between the set of utility servers and a second company; and (5) a first access control mechanism for controlling access to the set of resources and to the secure network connection, wherein access is limited to authorized individuals that are associated with one of at least two collaborating companies. The system further includes an isolated system that includes (1) a second set of servers maintained by a first company; (2) a second data storage mechanism associated with the second set of servers, which includes a first portion that contains data shared with the collaboration system and a second portion that contains data private to the isolated system; and (3) a second access control mechanism for controlling access to the second set of servers, wherein access is limited to only authorized individuals associated with the first company. In one embodiment, the system further includes (4) a switching mechanism coupled to the first and second data storage mechanisms, configured for copying shared data to the first and second data storage mechanisms and private data to only the second data storage mechanism. Hence, the second data is private to the first company and, therefore, isolated from the other collaborating companies, so that proprietary or other highly guarded information such as source code can be used in the overall collaboration effort while still being access-protected.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
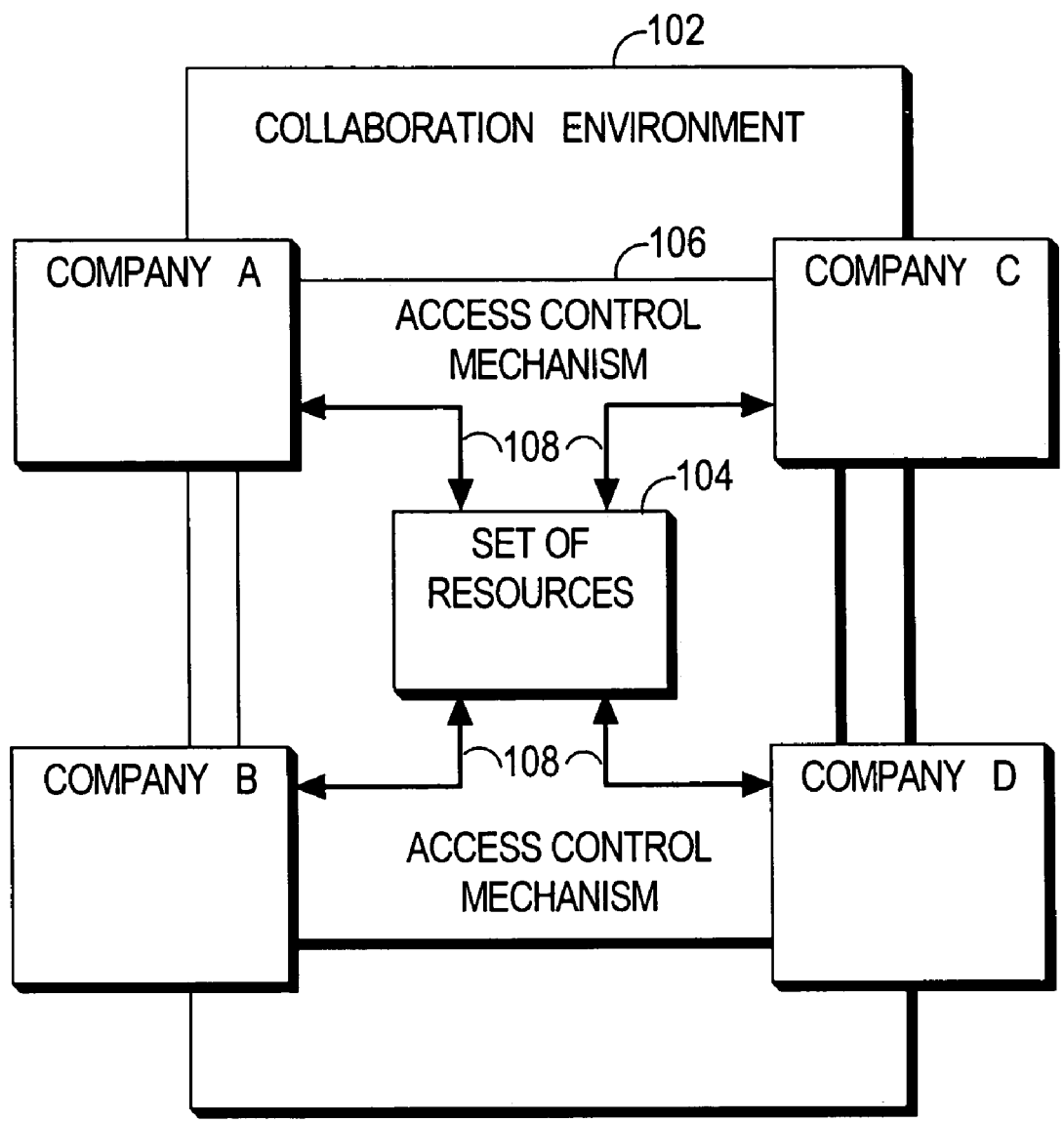
FIG. 1 is a block diagram logically illustrating a secure inter-company collaboration environment.

An isolated working system associated with a secure inter-company collaboration environment is described herein. Scenarios in which the invention is utilized by multiple companies drives many of the requirements provided by the collaboration environment, but the invention is not limited to use only among multiple companies. Therefore, a company may also be generally referred to herein as a "party."

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Inter-Company Collaboration

Multi-company or joint projects are quite common in some industries, and often these projects have significant security requirements. Some security requirements are simply due to the fact that multiple independent companies are working together on a given project, but need to maintain security of their non-project resources. For example, companies participating in joint development of integrated circuits are protective of their proprietary and intellectual property assets that are not related to the joint project. Hence, companies do not want other companies to have access to their assets and, consequently, they need to ensure that their intranets are secure from unauthorized sources outside of the company. Furthermore, often companies want to restrict access to sensitive information only to authorized employees within the company, e.g., only employees working on a particular project. Other security requirements are due to the nature of the project, such as "Secret" or "Top Secret" national defense-related projects that are required to maintain information in secrecy for purposes of national security, or legal projects which may span multiple law firms or multiple offices within a national or multinational firm and that are required to maintain client confidentiality with respect to communications and work products. Thus, there are many contexts in which a working environment should afford the ability to openly communicate and collaborate among authorized participants in a project, while at the same time be secure enough to protect some assets from undesired access.

The techniques described herein provide a unique engineering (or other) collaboration environment (sometimes referred to as "the chamber") that can unite multiple companies through a design or project lifecycle. These techniques provide a more flexible and "natural" engineering environment than prior approaches, essentially co-locating multiple parties virtually so that they can communicate and collaborate in real-time without the limitations and disadvantages of prior approaches. Collaboration, in this context, includes features that historically could not be achieved without physically co-locating project participants, and is intended to refer to project collaboration (e.g., design, development, or other joint effort to produce a work product) as opposed to a product exchange collaboration (e.g., a business-to-business product location/sales portal). These techniques also provide a trusted, secure remote working environment in which natural collaboration can be achieved without sacrificing the security of valuable information, intellectual property, and networks. These benefits are achieved through a novel and non-obvious combination of network architecture, security processes, and working tools and applications, which collectively are flexible enough to support different use models of, and adapt to changes during, a project lifecycle.

Whereas all project work could be performed at a single site, the collaboration environment also supports the division of work between sites. Thus, the environment can be adapted as new teams may be brought into the project during the project lifecycle or as the nature of the project evolves. For example, in the context of an organization that provides design and design support services (such as in the development of ICs), a typical project lifecycle could include the following phases: (i) initially supporting an existing project on an existing design environment at a customer site; (ii) transferring the design environment (i.e., the tools) to the secure inter-company collaboration environment (i.e., the chamber), and replacing or enhancing it; and (iii) running the existing project data in the new environment and debugging it. Use of the chamber allows developers from both, or all, of the participating companies to access the design environment in each of these phases, while allowing each company to maintain proper security from the outside and to control access to the project resources within each company at each phase of the project.

FIG. 1 is a block diagram logically illustrating a secure inter-company collaboration environment. As shown, four companies (Company 'A' through Company 'D') are collaborating in a collaboration environment 102. Note that the number of companies that can access or be constituent to the collaboration environment is not limited to any particular number. As presented above, collaboration among multiple parties typically utilizes shared resources, and secure collaboration relies on restricted access to the shared resources. Hence, Companies A through D have access to a set of resources 104 through an access control mechanism 106.

First, the set of resources 104 includes tools for completing the project or task at hand, such as relevant software applications to assist with the project tasks; remote viewing and controlling software for viewing and controlling the relevant software applications; file synchronization and management software for maintaining shared project documents and data among the companies; network administration/monitoring software, navigation software for accessing other resources; shared documents and data; and the like.

Second, access to the set of resources 104 is controlled and provided by the access control mechanism 106, in order to secure the environment and associated resources. Generally, the access control mechanism 106 could be physical (e.g., without limitation, simply a locked door or a "dumb" switch) or virtual (e.g., without limitation, a firewall program running on a computer), or a combination of both hardware and software (e.g., without limitation, a "smart" switch or gateway). The access control mechanism 106, however implemented, provides a first line of security with respect to accessing the set of resources 104, by limiting access to the resources to specific authorized individuals. Additional levels of security may be provided with respect to accessing certain resources from the set of resources 104, and are described below.

Note that the blocks representing the companies are depicted as overlapping with the collaboration environment 102, to illustrate the concept that each collaborating company provides and controls a portion of the collaboration environment 102, and that the collaboration environment 102 is essentially a secure extension of the companies' resources and environment. For example, each company may control a portion of the access control mechanism 106, such as a firewall interfacing between each respective company network and a secure network tunnel constituent to the set of resources 104. In this type of implementation, the chamber can be envisioned as encapsulating a portion of each company's resources and the shared project resources.

The companies associated with the inter-company collaboration environment 102, after gaining access through the access control mechanism 106, can communicate with each other and remotely access the set of resources 104, via a secure network connection 108.

Collaboration Environment Resources

Generally, various resources (such as a set of resources 104) are required in an environment in which work performance is expected. The collaboration environment of the present invention is no exception. FIG. 2A is a block diagram illustrating a set of resources 104 constituent to a collaboration environment 102, according to embodiments of the invention.

In one embodiment, the secure inter-company collaboration environment includes a set of resources 104 (FIG. 1), wherein the set of resources 104 includes a set of one or more utility servers 204, an isolated data storage 206, and an application remote controller 208. According to other embodiments, the set of resources further includes an optional file manager 210 and an optional communication mechanism 212.

A. Utility Server

The set of resources 104 (FIG. 1) of collaboration environment 102 (FIG. 1) includes one or more utility servers 204, which is typically implemented as software running on a computer platform. Utility server 204 is coupled to and accessible through the secure network connection 108, upon gaining access to the collaboration environment 102 through access control mechanism 106 (FIG. 1) and upon establishment of a secure association via secure association mechanism 220.

In order to collaborate on a project, the project participants require various tools or applications. Hence, the utility server is configured to execute a set of software applications 240 for performing the project work tasks. Access to the utility server 204 may require a separate log-in authorization procedure. The applications 240 may be stored on utility server 204, or may be accessed by utility server 204 if stored remotely. The software applications 240 include any software that parties may want to employ in the collaboration environment 102, to facilitate the collaboration and completion of the tasks at hand. The software applications 240 may include, without limitation, design/development/engineering software (e.g., CAD/CAE graphical tools), electronic design automation software, emulation software, etc.

In certain embodiments, particular types of software are available for executing on utility server 204. For example, application remote controller 208, file manager 210, and communication mechanism 212 are available for use in the collaboration environment 102 (FIG. 1), according to embodiments. These too can be provided on one or more utility servers 204, or on some other platform within the collaboration environment 102.

In one embodiment, the collaboration environment 102 (FIG. 1) architecture includes a utility server 204 at each company site, whereby the software applications 240 can be executed on any of the multiple utility servers 204.

B. Isolated Data Storage

The collaboration environment 102 (FIG. 1) has access to an isolated data storage 206, coupled to and accessible by a utility server 204 and used to securely store access-controlled (project) data 260. The data storage 206 is isolated in that it may be a portion of a larger data storage device or network, such as a disk collection, tape drive, or storage area network, but is partitioned per project. Furthermore, in one embodiment, the isolated data storage 206 is linked to the collaboration environment 102 through a secured subnet.

In one embodiment, access to the data 260 stored on data storage 206 is through a data authorization mechanism. For example, a separate log-in authorization procedure may be required to export data from the data storage 206 to the utility server 204, thus providing another layer of security to the data.

C. Application Remote Controller

The set of resources 104 (FIG. 1) of collaboration environment 102 (FIG. 1) includes application remote controller 208. Application remote controller 208 may be configured on one or more utility servers 204. To provide maximum collaboration functionality, application remote controller 208 is configured on each utility server 204 within the collaboration environment 102, thus providing equivalent capabilities to all collaboration parties.

Access to the set of resources 104 (FIG. 1) via the access control mechanism 106 (FIG. 1) provides the capability, via the application remote controller 208, to at least remotely:

(1) view a respective application user interface of one or more applications from the set of software applications 240, as the one or more applications are executing, with an application user interface viewer 280;

(2) "shadow" a respective application user interface of one or more applications from the set of software applications 240, as a different collaboration party executes the respective application, with an application user interface viewer 280; and (3) control execution of one or more applications from the set of software applications 240, with an application controller 282.

According to one embodiment, the application remote controller 208 provides the capability to remotely view a graphical user interface that displays a graphical representation. This capability offers advantages over prior approaches that provide remote viewing of text only, without graphics (e.g., models of physical products). For duplex remote viewing and controlling between parties, i.e., both parties can remotely view and control applications running on the other party's computer, both the client and host portions of the application remote controller 208 are installed on respective utility servers 204. Typically, shadowing also uses a request and authorization procedure between the parties involved in the shadowing. Examples of application remote controller 208 include, without limitation, Citrix® MetaFrame™, Oridus™ SpaceCruiser™, IBM XMX-LST, and Netopia® Timbuktu Pro, which provide desktop sharing and design communication tools.

Typically, application remote controllers are implemented in a client-server architecture, wherein the machine remotely accessing ("shadowing") the application is equipped with a client-side application and the machine executing the application is equipped with an associated server-side application. Furthermore, if a person or machine wants to both locally host applications and remotely access applications on another machine, that machine is equipped with both the client-side and server-side applications.

D. File Manager

In one embodiment, the set of resources 104 (FIG. 1) of collaboration environment 102 (FIG. 1) further includes file manager 210, configured to manage shared data files, such as access-controlled data 260 from isolated data storage 206. In one multiple server embodiment, file manager 210 is configured on all utility servers 204 of the environment 102, so that all parties can retrieve synchronized files, revise them if necessary, and save them. The file manager 210 provides a document control mechanism that enables parties to know what data has been imported from isolated data storage 206 and ensures that various copies of a file are kept in version synchronization. File manager 210 also provides monitoring of document retrievals. Thus, employment of a file manager 210 provides a virtual file system common to all parties using the collaboration environment 102.

A file manager such as file manager 210 typically includes a transmitter/receiver (T/R) 290 at each party site and a control panel 292 at one party site, although the invention is not limited to any specific architecture. The control panel 292 is used to set rules regarding copying of files from one T/R 290 to another, while the T/Rs 290 communicate with each other to exchange files back and forth while complying with the rules. Examples of rules include, without limitation: (1) copy file X from Party A to Party B at X time every day; and (2) as soon as Party A changes any file, copy the changed file to Party B; and (3) broadcast timestamp and file identifier to Party B each time Party A changes a file.

It is noteworthy that the file manager 210, and other resources, can essentially operate independent from human intervention. That is, once a collaboration environment 102 (FIG. 1) and its associated set of resources 104 (FIG. 1) are configured and initialized, the file manager 210 automatically operates in the background to manage and synchronize shared file resources.

E. Communication Mechanism

In one embodiment, the set of resources 104 (FIG. 1) of collaboration environment 102 (FIG. 1) further includes communication mechanism 212, configured to receive, store, and retrieve messages, textual or otherwise, from individuals that are authorized to access and work in the collaboration environment 102. Communication mechanism 212 facilitates the discussion of issues in a common location, thereby enhancing the quality of the collaboration. One example of communication mechanism 212 is a conventional electronic "bulletin board," but the invention is not so limited. Any mechanism allowing for posting of messages and reply messages, and providing organization and storage of such messages, may be used.

F. Navigation Mechanism

The set of resources 104 (FIG. 1) may also include, in some embodiments, a navigation mechanism, provided to guide the authorized individuals through the collaboration environment 102 (FIG. 1). Unlike portal models, in a multi-server environment architecture, the development tools embodied in software applications 240 can be executed on any of the constituent utility servers 204 or on other compute servers connected to the utility servers 204, and the architecture can change throughout the project lifecycle. Thus, the navigation mechanism assists in navigating through the collaboration environment 102 to locate and access particular resources of the set of resources 104. Furthermore, the navigation mechanism provides the capability to see which applications are currently being used and the status of equipment within the collaboration environment 102. For example, without limitation, a customized toolbar may embody the navigation mechanism.

Secure Network Connection

FIG. 2B is a block diagram illustrating the secure network connection 108. A secure network connection 108 is configured between each of the participating companies or organizations. In the case of two companies, there is a secure network connection 108 between them. In the case of more than two companies, there is a secure network connection 108 between a central company and each of the other companies, according to one embodiment. The term central company is used simply to indicate a managing or controlling company with respect to the overall environment, which is able to manage and administer the shared resources of the set of resources 104 (FIG. 1). A hub and spoke analogy may assist in visualizing the referenced architecture. In another embodiment, there is a secure network connection 108 between each company. The secure network connection 108 is coupled to an access control mechanism 106 (FIG. 1), which is described in more detail below.

A secure association mechanism 220 is used to establish a secure association. The secure association is a threshold process to gain access to the other components or functionality related to the secure network connection 108, i.e., a virtual point-to-point (PTP) network connection 222 and an encryption/decryption mechanism 224. Upon establishment of the secure association, a virtual point-to-point (PTP) network connection 222 is established. Once the virtual PTP is established, the parties can exchange data through an encryption/decryption mechanism 224. Thus, the secure association mechanism 220, virtual PTP network connection 222, and the encryption/decryption mechanism 224 contribute to the overall security of the secure network connection 108.

1. Secure Association Mechanism

The secure association mechanism 220 is configured to establish a secure association between parties that want to establish and use a secure network connection 108. The secure association mechanism 220 implements a recognition technique, whereby an electronic "handshake" between the parties is executed. For example, a technique that applies to ISDN (Integrated Services Digital Network) networks (which are commonly used in Europe) is for Party A to place a call, which identifies its device, to Party B and then to hang up. Party B's device is programmed to call back the calling party's device, i.e., the identified Party A device, and only that device. Thus, this form of request and acknowledge provides a secure association between Party A and Party B.

According to one embodiment, Party A communicates with Party B by providing its IP address and the serial number of a switching device that is used to communicate through the secure network connection 108 (e.g., a virtual private network (VPN) switching device). Party B looks up Party A's identifying information in a look-up table to verify that Party A is an authorized participant in the collaboration environment 102 (FIG. 1). Party A likewise, either before or after sending the communication to Party B, verifies Party B through its similar identifying information. Party A and Party B have established a mutual "essay" or secure association, and can therefore begin passing data between each other through a network "tunnel." That is, the parties can encrypt communications, via the encryption/decryption mechanism 224, and transmit them through the virtual PTP network connection 222.

The secure association may be the second layer of security with respect to the collaboration environment 102 (FIG. 1). In one embodiment, in addition to the secure association mechanism 220, the authorized individuals associated with Party A or Party B first identify themselves to access the machines configured within, or configured to access, the collaboration environment or system. The referenced first layer of security is embodied in the access control mechanism 106 (FIG. 1). For example, without limitation, individuals utilize a badge card in conjunction with a card reader to gain physical access to a computer that is configured to access the collaboration system. For another example, without limitation, individuals use a token to prove their respective authority to enter the collaboration environment. That is, they may have to input an often-changing number that is displayed on a device in the possession of the individual, whereby the device displays the currently authorized number that is kept synchronized with a remote verification computer. Thus, by knowing the correct number to input, the individual at least has possession of the device. This token technique, possibly in combination with a badge/card reader technique and a personal log-in process, provides another layer of security with respect to accessing the secure collaboration environment.

The foregoing techniques may be implemented at a physical entrance to the collaboration environment 102 (FIG. 1), or may be implemented electronically, such that a person attempting to remotely access the environment 102 would need to input all of the necessary identifying and token information into an interface to the access control mechanism 106 (FIG. 1). An example of remote input includes, without limitation, entering the information in a computer communicatively coupled to firewall software serving as the access control mechanism 106.

In one embodiment, the secure association (also referred to as the "essay") is periodically renewed by the secure association mechanism 220, via an automated request and acknowledgement process. That is, one party (Party A) is caused to request a "re-key" from the other party (Party B), whereby a commonly known (among the parties) number or other token is transmitted from the acknowledging party (Party B) back to the requesting party (Party A). The token (also referred to as a key) is generated and maintained synchronously at each party by a common algorithm. Consequently, the requesting party (Party A) can confirm the new key that it received from the other party, and the secure association is therefore renewed. Keys that do not match can be an indication that an attempt to breach security has occurred, and communication and collaboration should be stopped until the key issue is resolved.

2. Virtual Point to Point Network Connection

The virtual PTP network connection 222 (sometimes referred to as a "tunnel") contributes to the overall security of the secure network connection 108, and is established upon establishment of the secure association. The term "point-to-point" is used to refer to a characteristic of the connection between parties after a secure association is completed. Accordingly, the PTP connection 222 can be implemented in various ways, for example, without limitation, as a VPN (Virtual Private Network), Frame Relay circuit (which provides a "permanent" virtual circuit, with the provider determining the routing of the frames), ISDN, T1, etc. According to one embodiment, the virtual PTP network connection 222 is a VPN using the public network of networks commonly referred to as the Internet, bounded by VPN switches/devices at each end, i.e., at each party site. One point to note is that the PTP connection 222 cannot be circumvented due to the secure association mechanism 220 and the related key renewal process.

Furthermore, as the invention is not limited to any particular implementation of the virtual PTP network connection 222, it is also not limited to any specific protocol. If dedicated lines are not leased, then, functionally, the protocol implemented should be capable of effectively using a WAN such as the Internet as a LAN. Examples of communication protocols include, without limitation, PPP (Point to Point Protocol), PPTP (Point to Point Tunneling Protocol), and Layer 2 Tunneling Protocol. In addition, a proprietary tunneling protocol may be implemented to facilitate the virtual PTP network connection 222 within the collaboration environment 102 (FIG. 1).

In one embodiment, the virtual PTP network connection 222 is configured such that a set of one or more "open" ports at each end of the connection 222 is limited to only specific ports allocated for collaboration. That is, only the open ports will support communication therethrough. Consequently, signaling information or project data that is transmitted to ports that are not configured open for collaboration, is not received by the "receiving" party. Therefore, another level of security from outside intruders attempting to access the environment is provided. Likewise, attempts to transmit information or data from within the collaboration environment 102 (FIG. 1) out through an unopened port are also inhibited.

In one embodiment, the virtual PTP network connection 222 is configured such that communication through the connection 222 is limited to between the devices that established the secure connection. In another embodiment, the virtual PTP network connection 222 is configured such that communication through the connection 222 is limited to between the devices that are on the same subnets as the devices that established the secure connection.

3. Encryption/Decryption Mechanism

Encryption/Decryption Mechanism 224 also contributes to the overall security of the secure network connection 108. The encryption/decryption mechanism 224 supports the encryption of data that is transmitted across the virtual PTP network connection 222 after a secure association 220 has been established. As is known, encryption is the conversion of data or other information into a form that is not easily understood by unauthorized parties, and decryption is the process of converting encrypted data back into an understandable form, typically through use of a key (algorithm). The invention is not limited to any particular implementation of mechanism 224, thus, standard or proprietary algorithms can be used.

In one embodiment, triple DES (Data Encryption Standard) encryption is used to encrypt information transmitted across secure network connection 108, through which the information is encrypted and decrypted using three respective sub-keys (which may be implemented as a single triple-length key). That is, the first key is used to encrypt, the second key to decrypt, and the third key to encrypt. As technology evolves, other forms or methods of encryption can be used, for example, AES (Advanced Encryption Standard) algorithms such as Rijndael.

Access Control Mechanism

Access to the set of resources 104 (FIG. 1) within collaboration environment 102 (FIG. 1) is through access control mechanism 106 (FIG. 1). Therefore, one gains access to the collaboration environment 102 before establishing the secure association through secure association mechanism 220. In that sense, access control mechanism is the first layer of security provided by the collaboration environment. In general, the access control mechanism 106 provides limited access to the set of resources 104, while prohibiting access to other company networks. Hence, the companies using the collaboration environment cannot access other companies' internal networks and resources.

Access control mechanism 106 may be implemented at a physical entrance to the collaboration environment 102, or may be implemented electronically such that a person attempting to remotely access the environment 102 through a computer would input necessary identifying and token information into an interface to the access control mechanism 106. Examples of remote input include, without limitation, entering the information in a computer communicatively coupled to firewall software serving as the access control mechanism 106, and following a AAA (Authentication, Authorization, and Accounting) support protocol such as RADIUS (Remote Authentication Dial-In User Service). In this scenario, the firewall typically compares the identifying (for example, without limitation, personal identification and computer identification, such as IP address) and token information (if applicable) with a base of information (for example, without limitation, an access list) specifying authorized persons or machines, and consequently allows or disallows communications to be transmitted to and from the person's computer to a utility server 204 through a secure network connection 108 (for example, without limitation, a VPN tunnel).

In one embodiment, the access control mechanism 106 is configured to monitor accesses to the set of resources 104. For example, who and when someone "enters" the collaboration environment 102 can be electronically recorded in a log.

In one embodiment, each party to the collaboration environment 102 controls a portion of the access control mechanism 106. For example, each party could control respective firewalls that are passed through to enter the environment 102, wherein each respective firewall is an interface between each respective company network and the environment 102. This scenario is illustrated in the example presented in FIG. 3. Furthermore, this scenario is scalable such that, regardless of the number of participating parties, each party manages their respective firewall to grant or deny access to the collaboration environment 102 and the associated set of resources 104.

EXAMPLE

Collaboration Environment

Figure 3:
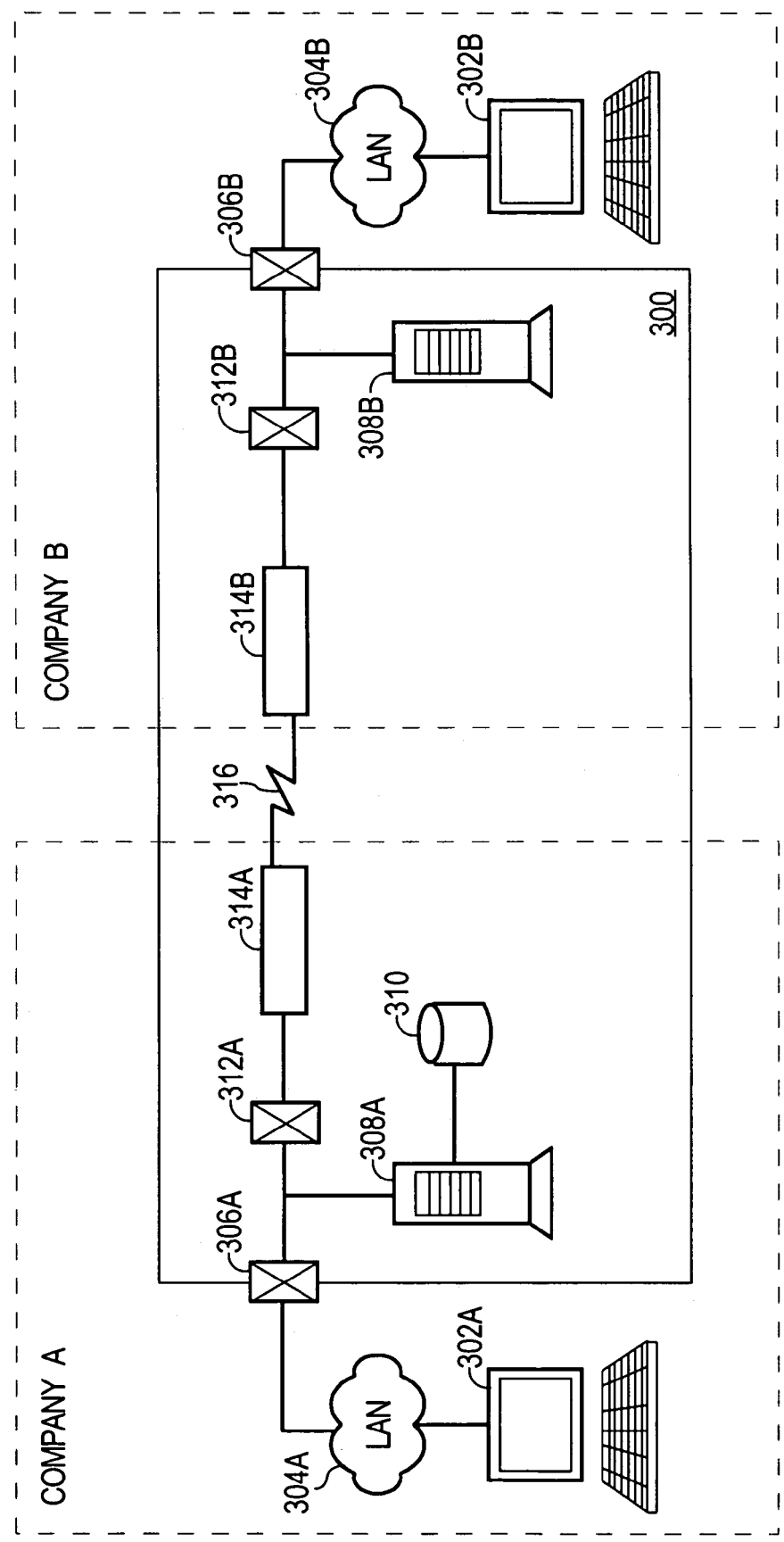
FIG. 3 is a diagram illustrating an example architecture for a collaboration environment, according to an embodiment of the invention.

FIG. 3 is a diagram illustrating an example architecture for a collaboration environment 102 (FIG. 1), according to an embodiment of the invention. The specific architecture presented is for illustration purposes, thus the invention is not limited to the architecture depicted.

FIG. 3 depicts a two-company collaboration environment 300, configured for Company A and Company B. As depicted, portions of the collaboration environment components are within each company, and similar components appear within each company, with the exception of data storage 310. Similar components (e.g., 302A and 302B) are at times referred to in this description collectively with a single reference (e.g., 302). Furthermore, the activities described below, with respect to accessing the collaboration environment 300 and constituent components, is applicable in both directions, i.e., from Company A to Company B and from Company B to Company A.

Each company uses a client machine 302 (e.g., a conventional computer) and a LAN 304, as an access mechanism to the environment 300. A firewall 306 provides the entrance point to the environment 300, and in this example provides the functionality of access control mechanism 106 (FIG. 1). Once an individual gets into the environment 300 (i.e., through firewall 306), the individual has access to a respective local server 308, which provides the functionality of utility server 204 (FIG. 2), on which they can use tools (e.g., software applications 240 of FIG. 2) to perform work tasks. Access to the server 308 may require an additional log-in and authorization procedure.

Figure 2:
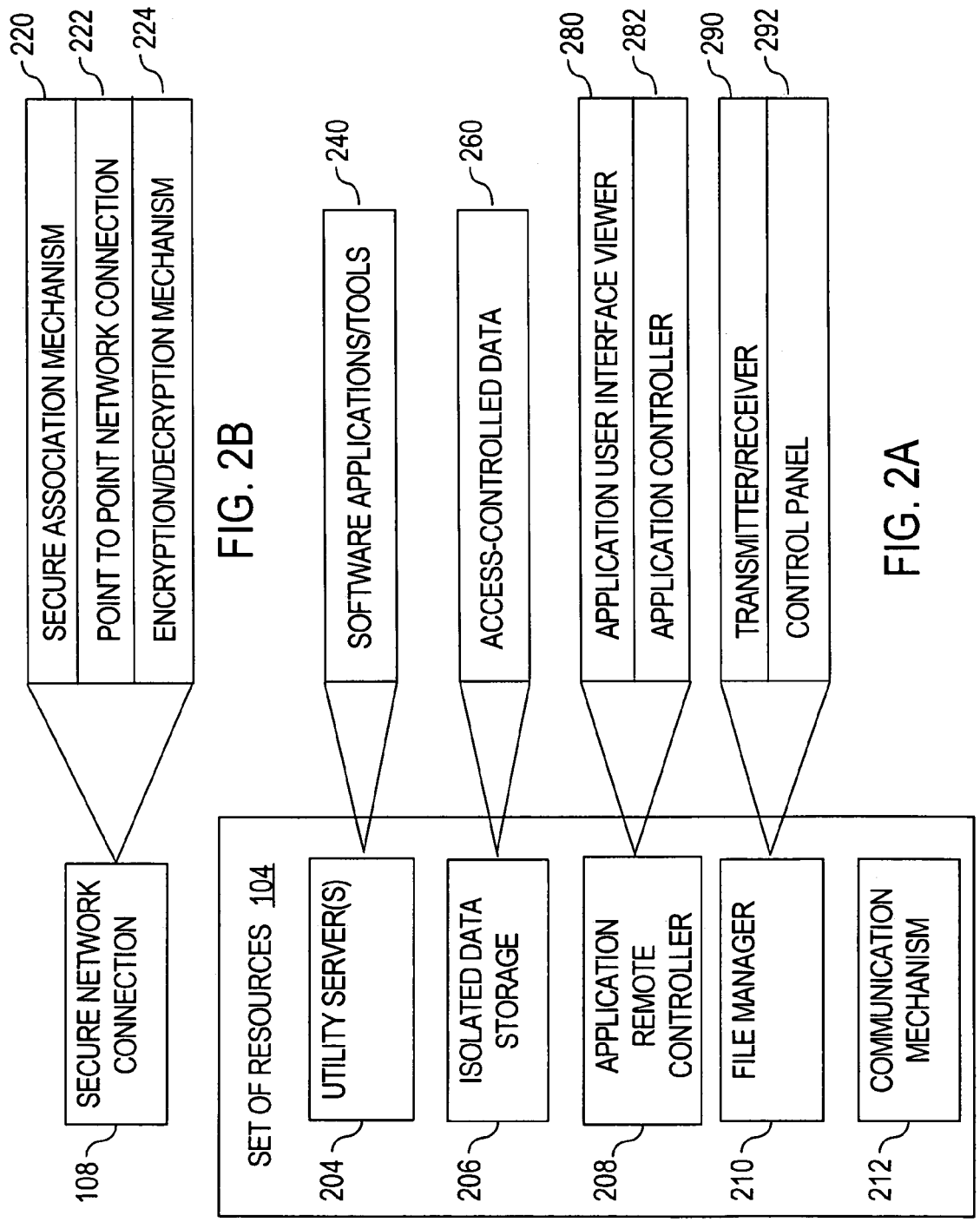
FIG. 2A is a block diagram illustrating a set of resources constituent to a collaboration environment, according to embodiments of the invention.
FIG. 2B is a block diagram illustrating a secure network connection.

In order to collaborate with the other company, an individual needs to get through a second firewall 312 to access a secure network connection (i.e., secure network connection 108 of FIG. 2). To establish and access the secure network connection, the individual needs to establish a secure association (described above) via VPN switch 314, upon which a connection 316 is established, with characteristics of a virtual point-to-point network connection 222 (FIG. 2). Once the connection 316 is established, the individual can begin to collaborate with the other company, including transmission and reception of encrypted data through the connection 316, utilizing an encryption/decryption mechanism 224.

Once the connection 316 is established, the individual can use an application remote controller 208 (FIG. 2) to remotely view and control applications executing on the other company's server 308. Access to the other company's server 308 may require another log-in and authorization procedure. In addition, the individual can gain access to data on a data storage 310, which provides the functionality of isolated data storage 206 (FIG. 2). Importing data (e.g., access-controlled data 260 of FIG. 2) from data storage 310 may again require an additional log-in and authorization procedure.

Note that one company could supply and or manage most of the components, except, practically speaking, client machine 302 and LAN 304. Note also that in order to ensure overall security of the collaboration environment 300, one company is likely to manage and control the majority of the components depicted in FIG. 3, except perhaps the other company's client machine 302, LAN 304, firewall 306, firewall 312, and server 308. To that end, network administration and monitoring resources can be installed to provide real-time monitoring of the network performance characteristics, such as utilization, uptime, and success ratio of jobs.

Configuring the servers 308 between two firewalls 306 and 312 protects them from unauthorized access from within the company (via firewall 306) as well as from unauthorized access from outside of the company (via firewall 312). Implementation of characteristics of the connection 316, i.e., a secure association mechanism 220 (FIG. 2) and a virtual PTP connection 222 (FIG. 2) through use of VPN switch 314, and an encryption/decryption mechanism 224 (FIG. 2), the environment 300 is protected from unauthorized access to the transmissions traveling between Company A and Company B. Hence, even if hackers were able to gain access to the connection 316 and intercept communications, they would not likely be able to decrypt the encrypted data, nor send or receive any data to the server 308 and beyond into the LAN 304.

As previously described, if a person or machine (e.g., utility server 308A) wants to both locally host applications and remotely access applications on another machine, that machine is equipped with both the client-side and server-side applications. In addition, in the system architecture depicted in FIG. 3, accessing an application or other resources residing on utility server 308B from client machine 302A uses both client-side and server-side software on utility server 308A as well as server-side software on utility server 308B, according to one embodiment. As such, client 302A is a client to host utility server 308A with respect to accessing resources on utility server 308A through firewall 306A, and utility server 308A is a client to host utility server 308B with respect to accessing resources on utility server 308B. Hence, client 302A is able to remotely view and control resources on utility server 308B, through utility server 308A.

For example, for client 302A to view or shadow an application executing on utility server 308B, client 302A first invokes the local client-side remote controller to remotely access utility server 308A by communicating with the server-side remote controller residing on utility server 308A. The server-side remote controller on utility server 308A invokes the client-side remote controller residing locally on utility server 308A, to communicate with the server-side remote controller residing on utility server 308B. Consequently, through this interaction between client-side and server-side remote controller applications, client 302A makes a "double-hop" to gain viewing and controlling capabilities with respect to applications executing on remote utility server 308B.

According to one embodiment, one collaboration party (e.g., Company A) can use an application remote controller 208 (FIG. 2) from Vendor X or a proprietary application remote controller 208 to access resources on utility server 308A. Company A can then use an application remote controller 208 from Vendor Y or an application remote controller 208 that is proprietary to another collaborating party (e.g., Company B) to execute a computing job on utility server 308B or to shadow a job executing by Company B on utility server 308B. Furthermore, Company A can run an application (e.g., a design application) proprietary to Company B. As such, a practical but non-limiting implementation includes a situation in which Company B has internal technology (proprietary or otherwise) that is not available to Company A, and Company A is allowed limited use of the internal technology strictly within the collaboration environment 300.

EXAMPLE

Use of Collaboration Environment

There are numerous scenarios in which the collaboration environment is useful. One example implementation of the teachings provided herein is as follows.

Company A (e.g., Cadence Design Systems Inc.) designs and markets integrated circuit design tools, i.e., software applications for designing, laying out, verifying, emulating, etc., integrated circuits. In addition, Company A also provides design and CAD management services, based on their expertise in the field of IC design and their intimate knowledge and expertise with the aforementioned design tools. Company B designs and markets integrated circuits using Company A's design tools.

During Company B's design cycle for a particular IC, engineering issues arise in which consultation with Company A's services experts is required. Thus, a secure collaboration environment 300 (FIG. 3) is configured, so that Company A services experts can collaborate with Company B's design engineers. Each company provides a utility server protected by firewalls 306A-B and 312A-B (FIG. 3) from inside the respective companies and protected from the public network (e.g., the Internet) used to facilitate the secure network connection 108 (FIG. 1).

Advantageously, after establishment of a secure network connection (e.g., a VPN between Company A and Company B over the Internet), Company B engineers can execute jobs on their utility server 308B (FIG. 3) using Company A's design applications, and Company A experts can remotely view (or shadow), launch, and control the execution of the jobs on Company B's utility server 308B, in real-time via Company A's utility server 308A. The foregoing process uses application remote controller 208 (FIG. 2) and the secure network connection 108 (FIG. 2) in communicating between utility server 308A and utility server 308B. Company A experts can view the graphical representations generated by the design applications, and can remotely launch and control execution of the application if necessary.

In addition, Company B can remotely view and control applications executing on Company A's utility server 308A, via Company B's utility server 308B. For example, Company A's engineers may identify a problem using the foregoing techniques, and demonstrate a solution to that problem on utility server 308B. Again, the application remote controller 208 and the secure network connection 108 are used to communicate between utility server 308B and utility server 308A.

Still further, once the collaboration environment 300 is established, applications at Company A can interact with applications at Company B with no human intervention. For example, the file manager 210 runs in the background to automatically manage and synchronize shared resources. Since the collaboration environment 300 is "always on", other applications, such as scripts, can be installed at each site to enable background (i.e., automatic) interaction between the sites for various purposes. Hence, the application interaction described is distinct from application interactions that occur in a hosted environment.

Monitoring tools can also be installed into the collaboration environment to facilitate one company monitoring and measuring work at the other company site. For example, software tools exist that can perform all of the following functions: (1) run jobs, (2) monitor the jobs, (3) analyze the job output, (4) revise the job parameters based on the analysis, and (5) re-run the jobs with the revised parameters. Thus, a monitoring tool at Company A can measure and analyze jobs or processes running on the Company B utility server 308B, and add value to the process running at Company B by revising the parameters and resubmitting the job. This iterative process provided by such a tool can be automated to a certain extent and facilitates the fine-tuning of a design. Thus, such a tool can be installed on a utility (e.g., utility server 308A, 308B) or other server within the collaboration environment 102 (FIG. 1) as part of the applications 240 (FIG. 2) of the set of resources 104 (FIG. 1), to facilitate real-time collaboration between Company A and Company B.

The foregoing is an example of a practical use of the systems described herein, but use of the invention is not so limited. Those skilled in the art can appreciate other implementations of the techniques described, which fall within the scope of the claims appended hereto.

Method for Providing A Secure Inter-Company Collaboration Environment

Figure 4A:
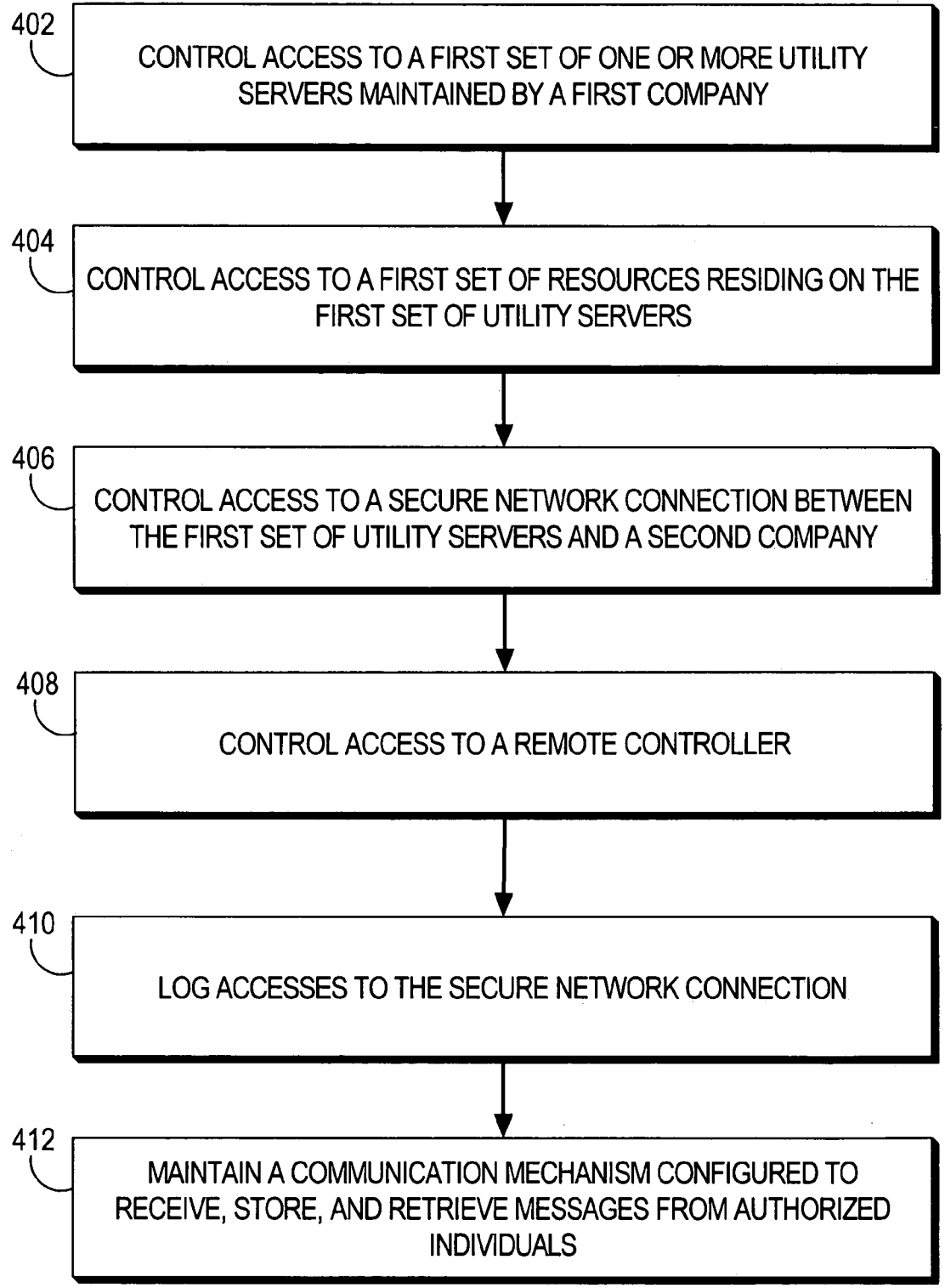
FIG. 4A is a flowchart illustrating a method for providing a secure inter-company collaboration environment, according to embodiments of the invention.

FIG. 4A is a flowchart illustrating a method for providing a secure inter-company collaboration environment, according to embodiments of the invention. With reference to FIG. 4A, step 402 controls access to a first set of one or more utility servers maintained by a first company (for example, utility server 308A of FIG. 3 or utility server 204 of FIG. 2). Depending on whether access to a local server (e.g., at Company A from viewpoint of Company A) or a remote server (e.g., at Company B from viewpoint of Company A) is being controlled, step 402 can be implemented, for example, with access control mechanism 106 (FIG. 1) in the case of a local server; or access control mechanism 106 and secure network connection 108 (FIG. 2) in the case of a remote server.

At step 404, access to a first set of resources (for example, set or resources 104 of FIG. 1) residing on the first set of utility servers is controlled. In this context, the set of resources 104 does not necessarily include the utility server 204 as depicted in FIG. 2, for access to the utility server 204 is controlled at step 402. Thus, in addition to controlling access to the set of resources 104 by controlling access to the utility server 204 on which the applications 240 (FIG. 2) reside, access to the applications 240 may require an additional log-on routine and one or more associated verification/authorization routines. Access to the other resources of the set of resources, such as isolated data storage 206, application remote controller 208, file manager 210, and communication mechanism 212, may also be controlled via additional log-on and verification/authorization routines.

Step 406 controls access to a secure network connection (for example, secure network connection 108 of FIG. 2B) between the first set of utility servers and a second company participating in project collaboration. Step 406 can be implemented, for example, via secure association mechanism 220 (FIG. 2), as described above. Controlling access to the secure network connection also controls use of the network connection.

Figure 4B:
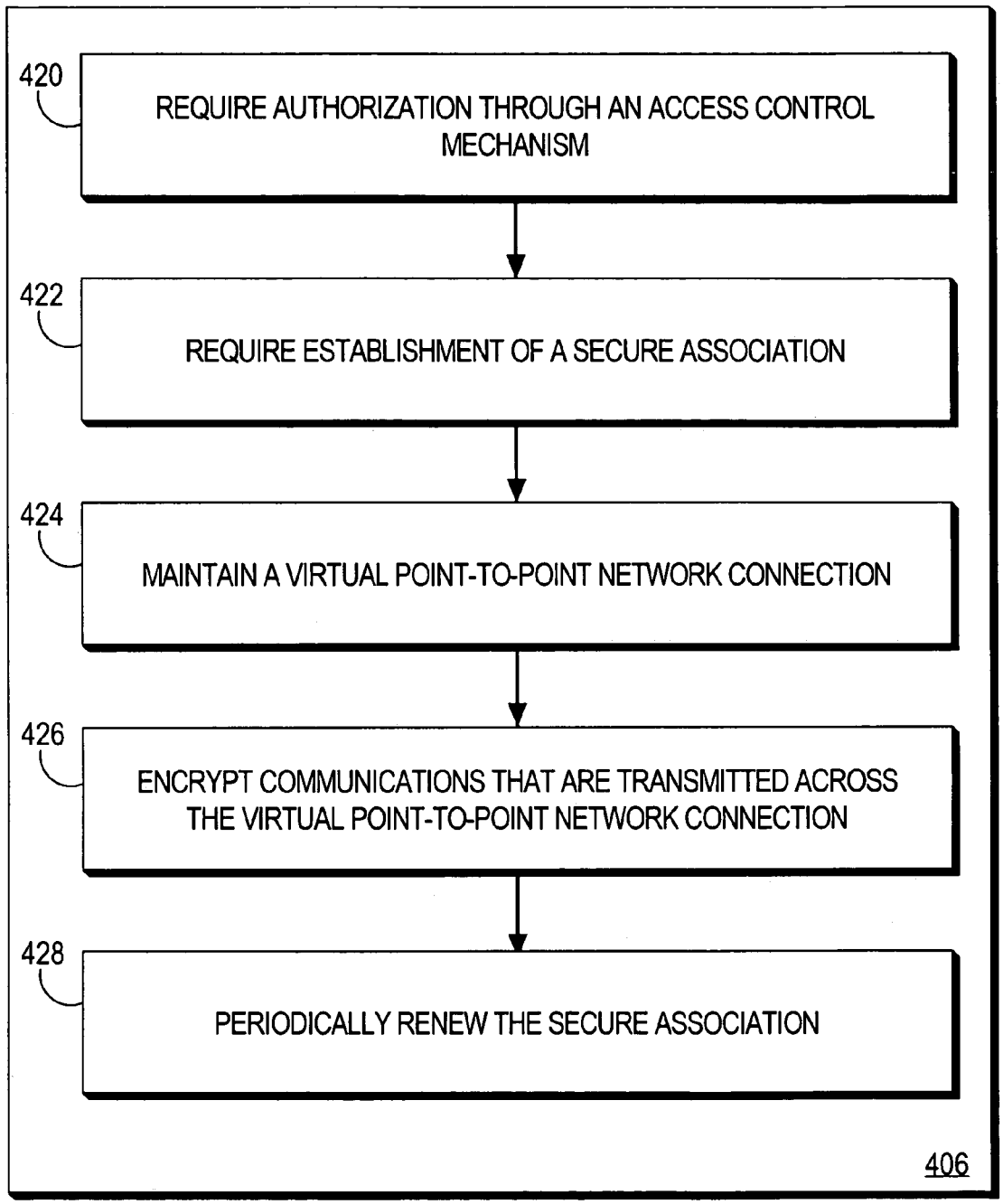
FIG. 4B is a flowchart illustrating a method for controlling access to a secure network connection between companies, according to embodiments of the invention.

FIG. 4B is a flowchart illustrating a method for controlling access to a secure network connection between companies, i.e., step 406 of FIG. 4A, according to embodiments of the invention. At step 420, authorization through an access control mechanism (for example, access control mechanism 106 of FIG. 1, as described above) is required. At step 422, establishment of a secure association (for example, secure association mechanism 220 of FIG. 2B, as described above), is required. At step 424, upon establishment of the secure association in step 422, a virtual point-to-point network connection (described above) is maintained. At step 426, communications that are transmitted across the virtual point-to-point network are encrypted (for example, through encryption/decryption mechanism 224 of FIG. 2B, described above). At optional step 428, the secure association is periodically renewed. Implementation of step 428 can be through secure association mechanism 220, as described above.

Returning to FIG. 4A, access to a remote controller (for example, application remote controller 208 of FIG. 2A) is controlled at step 408. This step can be independent of step 404, at which the first set of resources is generally controlled, or can be a sub-step of step 404. As described above, access to a remote controller may require additional log-on and verification/authorization routines. Furthermore, if the remote controller is proprietary to a particular company, that company may require additional routines to be performed to access their proprietary remote controller.

At optional step 410, access to the secure network connection is logged, i.e., recorded. Hence, monitoring the use of the collaboration environment 102 (FIG. 1), generally, is thereby provided. In addition, monitoring of network traffic across the secure network connection may also be provided, typically, for security purposes. Step 410 can be implemented, for example, by access control mechanism 106 (FIG. 1).

At optional step 410, a communication mechanism that is configured to receive, store, and retrieve messages from authorized individuals, is maintained. Step 410 can be implemented by using a conventional electronic bulletin board application.

The foregoing processes represent, generally, a method for providing a secure inter-company collaboration environment such as collaboration environment 102 (FIG. 1) or collaboration environment 300 (FIG. 3). Although process steps are described in a particular order in FIGS. 4A and 4B, embodiments of the invention are not necessarily limited to any particular order of carrying out such steps, nor are embodiments necessarily limited to carrying out every step described. Thus, implementation of the principles, techniques, and mechanisms described herein may vary considerably and still fall within the scope of the invention.

Isolated Working Chamber Associated with A Collaboration Environment

Figure 5:
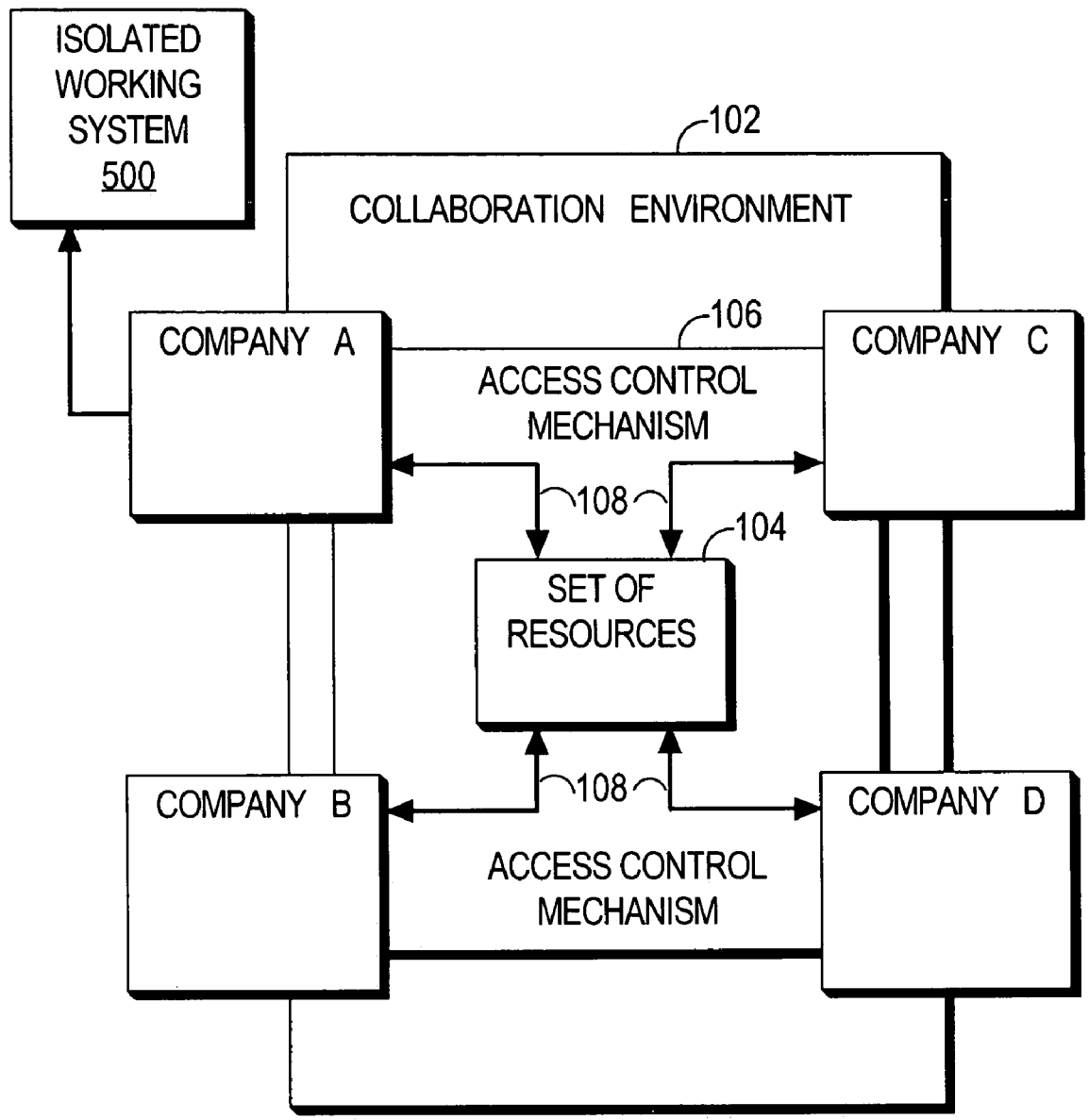
FIG. 5 is a block diagram logically illustrating an isolated working system that is associated with a secure inter-company collaboration environment.

FIG. 5 is a block diagram logically illustrating an isolated working system, or "chamber", that is associated with a secure inter-company collaboration environment. FIG. 5 is similar to FIG. 1 except for the addition of isolated working system 500 coupled to Company A. As shown, four companies (Company 'A' through Company 'D') are collaborating in a collaboration environment 102. Note that the number of companies that can access or be constituent to the collaboration environment is not limited to any particular number. As presented above, collaboration among multiple parties typically utilizes shared resources, and secure collaboration relies on restricted access to the shared resources. Hence, Companies A through D have access to a set of resources 104 through an access control mechanism 106. Refer to the descriptions of FIGS. 1-3 for detailed description regarding collaboration environment 102, set of resources 104, access control mechanism 106 and secure network connection 108.

Isolated working system 500 ("isolated system") includes tools for completing tasks at hand, such as debugging an electronic design automation (EDA) or other application. Since applications at times encounter errors when executing within a specific scenario with specific external data, the actual external data that caused the error is often needed to recreate the error in a separate instance of the application. Furthermore, since debugging a software application is an iterative process, it is most productive for a debugger to have the application source code readily available, as well as a compiler for the source code.

In an embodiment, isolated system 500 at times includes external customer data and application source code. Generally, in this context, source code refers to information required to reliably build and test application software code. For example, source code may include compiler settings, regression tests and platform-specific information for building and testing code. In another embodiment, isolated system 500 further includes a compiler for compiling the application source code.

In such a scenario, even though Companies A-D are collaborating on a project, the company owning the application may wish to strictly control access to proprietary source code associated with the application. Therefore, access to isolated system 500 and the resources within is controlled and limited to authorized individuals from the application-owning company, such as Company A. None of the other Companies B-D is granted or able to gain access to isolated system 500, hence, the system is "isolated". Similar to the access control mechanism 106 in the context of the collaboration environment 102, access to the isolated system 500 may be controlled physically (e.g., without limitation, simply a locked door or a "dumb" switch) or virtually (e.g., without limitation, a firewall program running on a computer), or a combination of both hardware and software (e.g., without limitation, a "smart" switch or gateway).

Isolated System Resources

Figure 6:
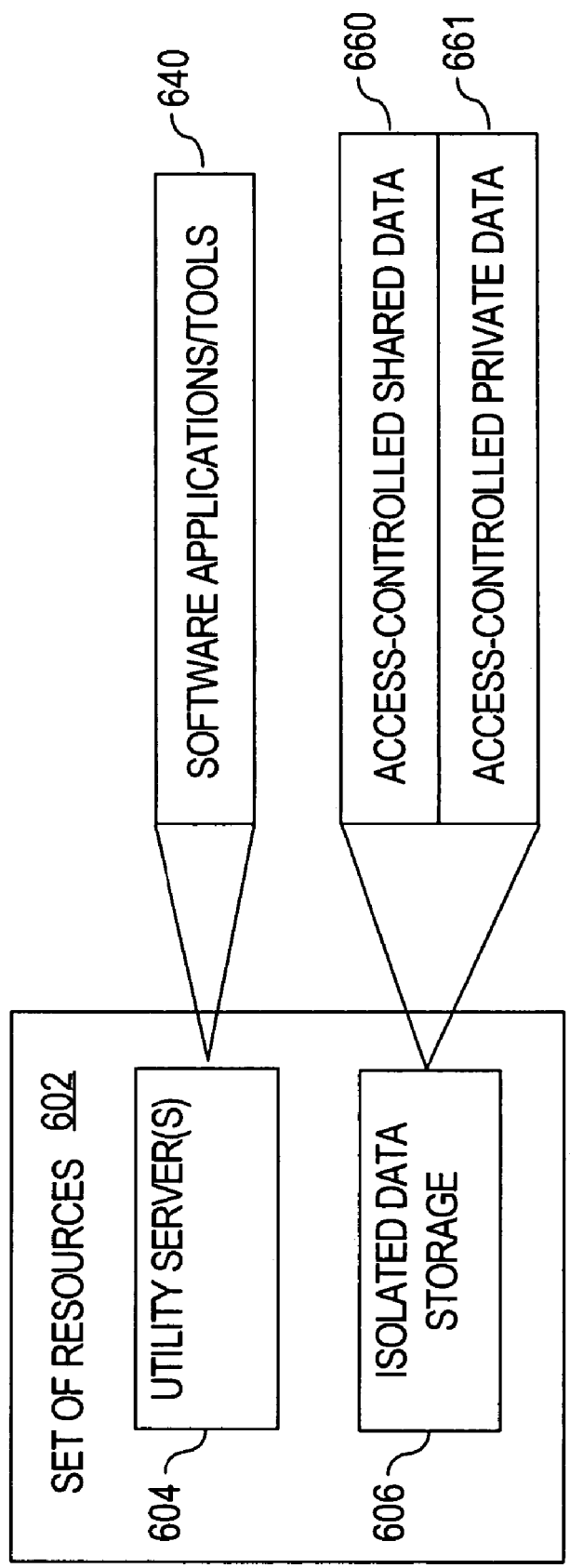
FIG. 6 is a block diagram illustrating a set of resources constituent to an isolated system.

Similarly to the collaboration environment 102, the isolated system 500 benefits from having various resources, such as a set of resources 602, available to perform work. FIG. 6 is a block diagram illustrating a set of resources 602 constituent to an isolated system 500, according to embodiments of the invention.

In the context of the following description, Company A is considered the controlling and managing entity associated with isolated system 500. Therefore, access to the set of resources 602 associated with isolated system 500 is limited to specific authorized individuals associated with or approved by Company A. The specific individuals who are granted access to the set of resources 602 of isolated system 500 may include a subset of the individuals associated with Company A who are granted access to collaboration environment 102, or may be an entirely different set of individuals than those with access to collaboration environment 102.

In one embodiment, the set of resources 602 includes a set of one or more utility servers 604 and an isolated data storage 606.

A. Utility Server

Figure 9:
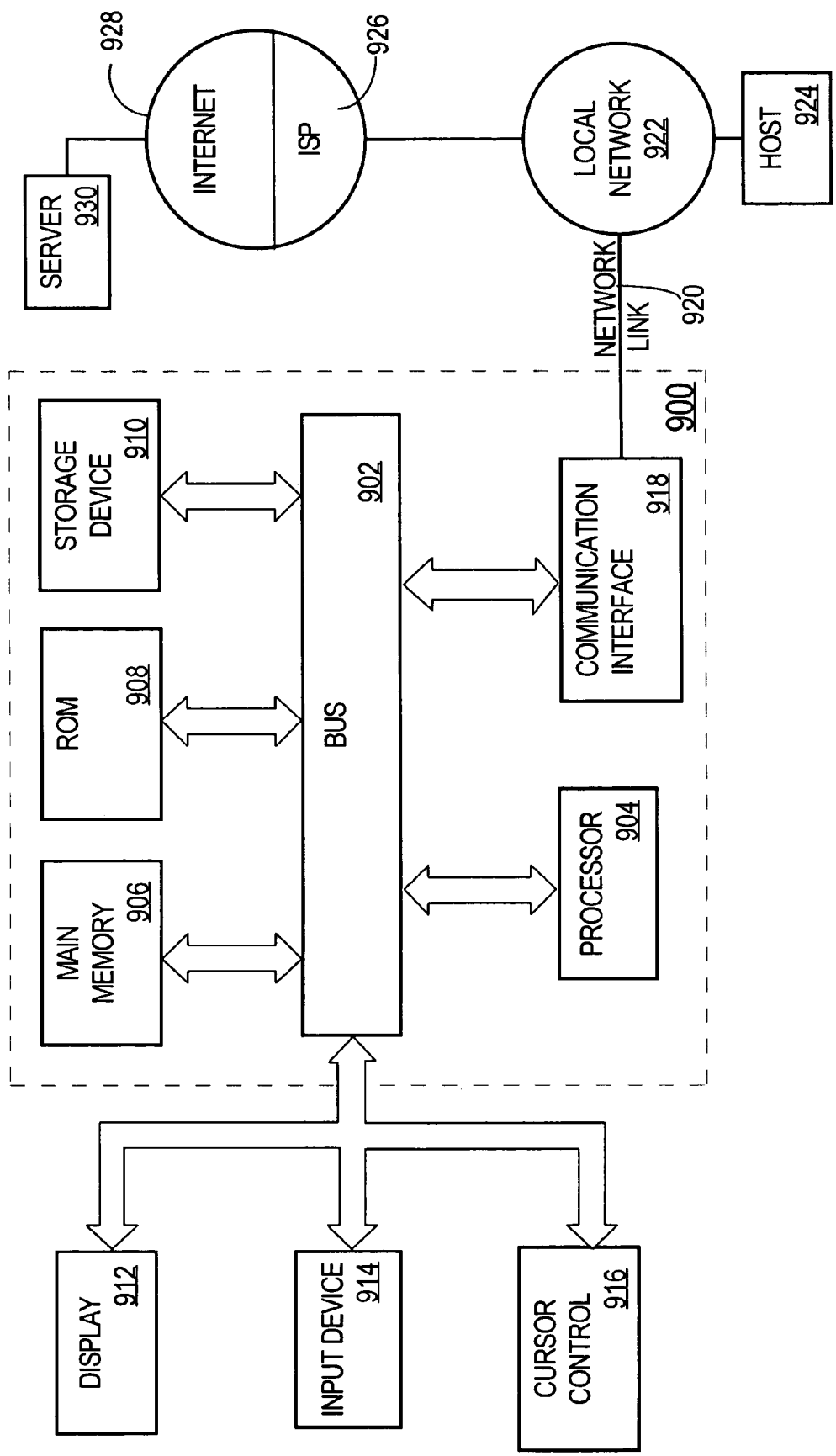
FIG. 9 is a block diagram that illustrates a computer system on which components of embodiments may be implemented.

The set of resources 602 of isolated system 500 includes one or more utility servers 604, typically implemented as software running on a computer platform such as computer system 900 (FIG. 9). Utility server 604 is coupled to and accessible through a corporate LAN 304A (FIG. 7) that is managed and controlled by the same party that has access to isolated system 500, such as Company A.

Figure 7:
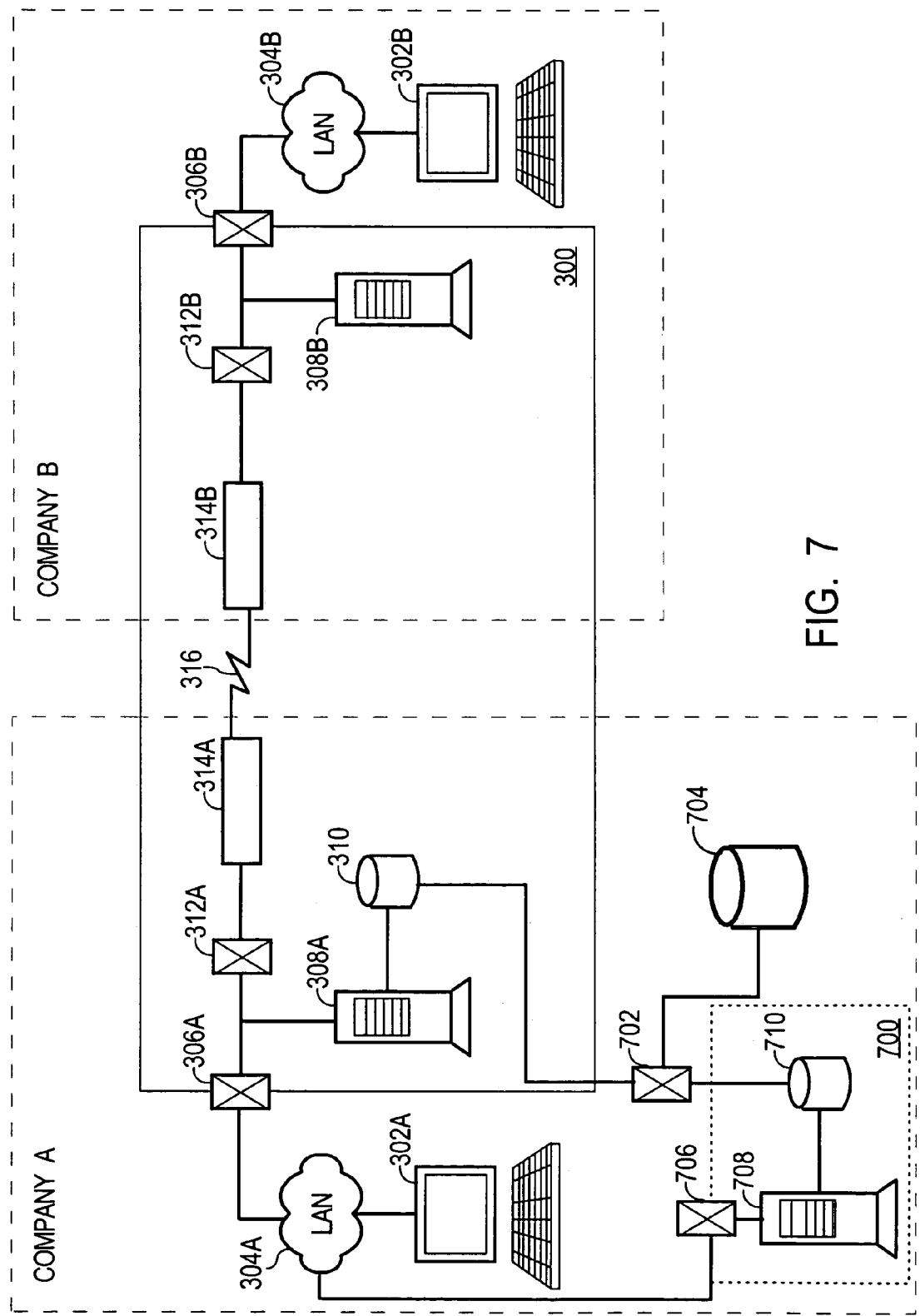
FIG. 7 is a diagram illustrating an example architecture for an isolated system that is associated with a secure inter-company collaboration environment.

In order to perform work in the isolated system 500, the authorized individuals require various tools or applications. Hence, the utility server 602 is configured to execute a set of software applications 640. The software applications 640 include any software that one may want to employ in the isolated system 500, to facilitate the completion of the tasks at hand. For example, in the context of a "debugging chamber", the utility server machine is configured to execute the application being debugged, a compiler for source code associated with the application, and perhaps debugging tools. The applications 640 may be stored on utility server 602, or may be accessed through utility server 602 if stored remotely, such as on data storage 704 (FIG. 7). Access to the utility server 602 may require a log-in authorization procedure in addition to authority to communicate through a firewall, gateway, switch or the like, that couples the utility server 602 to the corporate LAN 304A (FIG. 7).

B. Isolated Data Storage

The isolated system 500 (FIG. 1) has access to an isolated data storage 606, coupled to and accessible by a utility server 602 and used to securely store access-controlled shared data 660 and access-controlled private data 661. The data storage 606 is isolated in that it is only accessible to authorized individuals associated with Company A, for example, and not accessible to Companies B-D that have access to the collaboration environment 102 coupled to the isolated system 500. Data storage 606 includes a first storage portion that contains data that is shared with the communicatively coupled collaboration system, such as shared data 660, and a second storage portion that contains data that is private to the isolated system, such as private data 661. Furthermore, isolated data storage 606 may be a portion of a larger data storage device or network, such as a disk collection, tape drive, or storage area network, which is partitioned per project.

In one embodiment, access to data 660 and data 661 stored on data storage 606 is through a data authorization mechanism. For example, a separate log-in authorization procedure may be required to export data from the data storage 606 to the utility server 604, thus providing another layer of security to the data.

Access-controlled shared data 660 is data that is shared with the collaboration environment 102. For example, shared data 660 may include data that represents a problem scenario associated with the collaboration project in which Companies A-D are participating, such as data that represents an electrical circuit design. In an embodiment, shared data 660 is exported, from a storage device external to the collaboration environment 102 and the isolated system 500, such as storage device 704 (FIG. 7), to both the collaboration environment 102 and the isolated system 500.

Shared data 660 is data that can be shared among the companies, in contrast with access-controlled private data 661, which is private to Company A and, therefore, not accessible to Companies B-D. In the debugging example, private data 661 includes the proprietary source code of the application being debugged. For example, isolated system 500 may be used to debug EDA software in conjunction with shared data 660 that includes data that represents a problem scenario associated with the collaboration project, such as the data that may have caused the software processes to fail.

In an embodiment, private data 661 is exported, from a storage device external to the collaboration environment 102 and the isolated system 500, such as storage device 704 (FIG. 7), to only the isolated system 500 and not the collaboration environment 102.

EXAMPLE

Isolated System

FIG. 7 is a diagram illustrating an example architecture for an isolated system, such as isolated system 500 (FIG. 5), that is associated with a secure inter-company collaboration environment, such as environment 102 (FIG. 1), according to an embodiment of the invention. The specific architecture presented is for illustration purposes, thus the invention is not limited to the exact architecture depicted. FIG. 7 depicts a two-company collaboration environment 300, configured for Company A and Company B, and a single-company isolated system 700, configured for Company A only. Isolated system 700 is configured with different rules than environment 300. For example, different rules may apply with respect to governing and managing access, connectivity, file size, file systems, etc. A detailed description of the components that constitute a collaboration environment 300 is presented above in reference to FIG. 3.

Company A uses a client machine 302A (e.g., a conventional computer) and a LAN 304A, as an access mechanism to the isolated system 700. A firewall 706 provides the entrance point to the isolated system 700 and, in this example, provides a portion of the functionality of an access control mechanism. Once an individual gets into the isolated system 700 through firewall 706, the individual has access to a respective local server 708, which provides the functionality of utility server 604 (FIG. 6). The individual can use tools (e.g., software applications 640 of FIG. 6) that execute on server 708 to perform work tasks, such as debugging an application. As mentioned, access to the server 708 may require an additional log-in and authorization procedure.

Once access to the isolated system 700 is obtained by an authorized individual, the individual can gain access to shared data 660 and private data 661 (FIG. 6) from an external data storage 704. Shared data 660 and private data 661 may simply be viewed from server 708 while maintained on external data storage 710. Alternatively, shared data 660 and private data 661 may be copied to a data storage 710, which provides the functionality of isolated data storage 606 (FIG. 6), within isolated system 700. Importing data (e.g., private data 661) from external data storage 704 to internal data storage 710 may again require an additional log-in and authorization procedure.

A switching means 702 is configured between isolated system 700 and environment 300. Specifically, switching means 702 is communicatively coupled to data storage 310 of environment 300, to data storage 710 of isolated system 700, and to external data storage 704. Switching means 702 may be implemented (A) as hardware, such as a conventional switch mechanism, (B) virtually, such as a software program running on a computer system such as computer system 900 of FIG. 9, or (C) as a combination of both hardware and software, such as a "smart" switch or gateway with embedded code.

The external data storage 704 serves as a master storage device or storage network that serves, or exports, data to the respective "local" data storage devices 310, 710 through switch 702. Hence, through switching techniques employed by switching means 702, external data storage 704 exports shared data 660 to both the environment 300 and the isolated system 700 and exports private data 661 only to isolated system 700. Private data 661 is, therefore, private to Company A. In summary, data stored on data storage 310 is visible by users with access to server 310, data stored on data storage 710 is visible only to users with access to server 708, and data stored on external data storage 704 is visible to users with access to server 308 and/or to server 708, depending on whether it is shared data 660 or private data 661.

Configuring the firewall 706 between the server 708 and the LAN 304A protects the server 708, via firewall 706, from unauthorized access from within Company A. Furthermore, since server 708 is not connected to any outside network, it is protected from unauthorized access from outside of Company A. Consequently, proprietary information that is visible via server 708 is visible only to authorized individuals via server 708.

Figure 8:
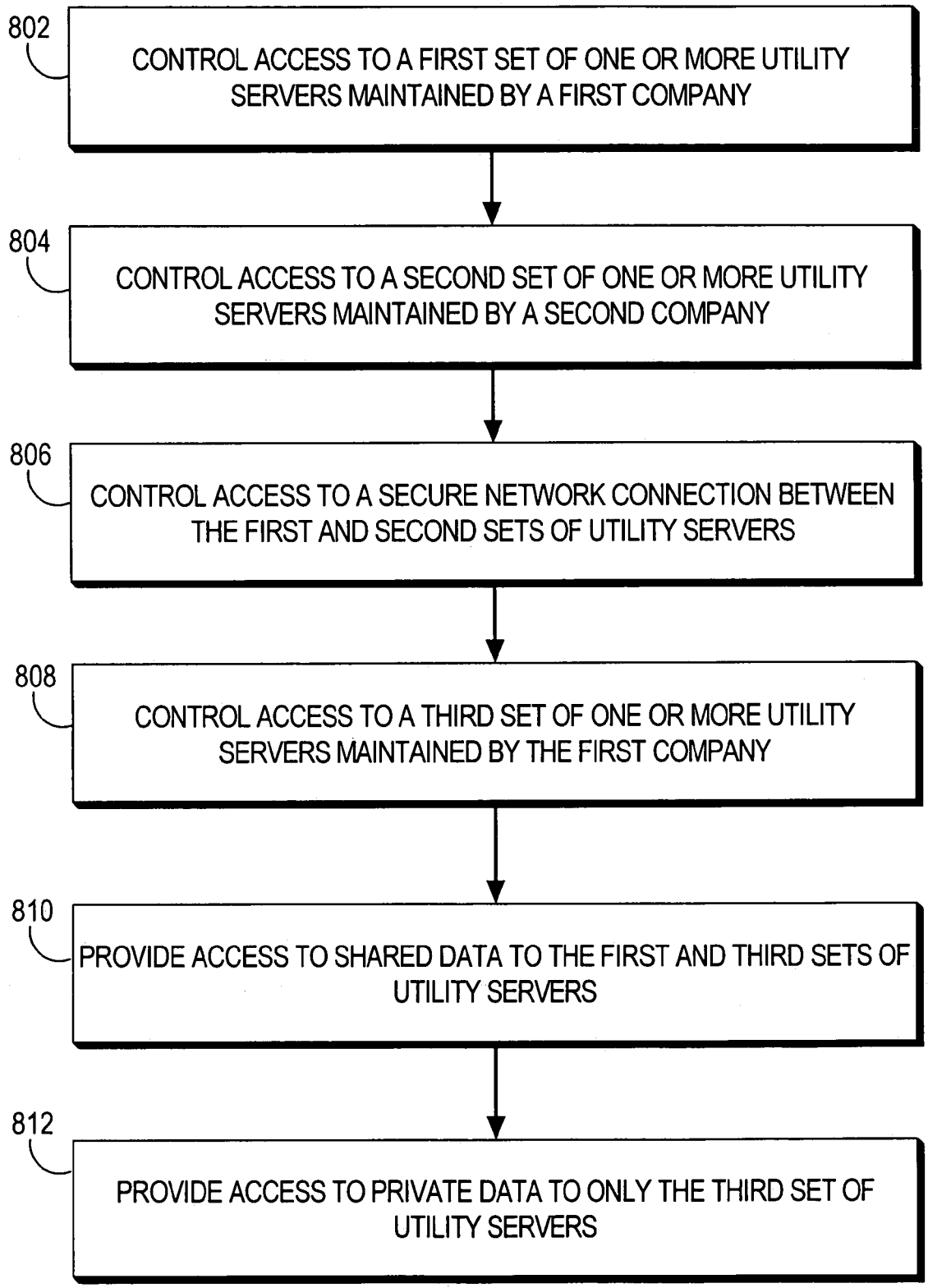
FIG. 8 is a flowchart illustrating a method for providing a secure system for working in isolation from an inter-company collaboration environment.

Method for Providing A Secure System for Working in Isolation from an Associated Inter-Company Collaboration Environment FIG. 8 is a flowchart illustrating a method for providing a secure system for working in isolation from an inter-company collaboration environment, according to embodiments of the invention.

At step 802, access to a first set of one or more utility servers maintained by a first company is controlled. For example, access to utility server 308A of FIG. 7 is controlled by Company A, whereby access is limited to specific individuals that are associated with Company A. Depending on whether access to a local server (e.g., at Company A from viewpoint of Company A) or a remote server (e.g., at Company B from viewpoint of Company A) is being controlled, step 802 can be implemented with access control mechanism 106 (FIG. 1) in the case of a local server; or access control mechanism 106 and secure network connection 108 (FIG. 2) in the case of a remote server.

At step 804, access to a second set of one or more utility servers maintained by a second company is controlled. For example, access to utility server 308B of FIG. 7 is controlled by Company B, whereby access is limited to specific individuals that are associated with Company B. Furthermore, access to utility server 308B may be managed and/or controlled by Company A, even when access is limited to only specific individuals that are associated with Company B.

At step 806, access to a secure network connection, such as secure network connection 108 of FIG. 2B, between the first set of utility servers and the second set of utility servers, is controlled. Access to the secure network connection is limited to authorized individuals that may be associated with either Company A or Company B. Step 806 can be implemented, for example, via secure association mechanism 220 (FIG. 2), as described above. Controlling access to the secure network connection also controls use of the network connection. At this stage of the process, a secure inter-company collaboration environment is established via steps 802-806.

At step 808, access to a third set of one or more utility servers is controlled. For example, access to utility server 708 of isolated system 700 (FIG. 7) is controlled by Company A, whereby access is limited to specific individuals that are associated with Company A. Access to the third set of utility servers is controlled through use of firewall 706 and use of a request and response mechanism, such as SecureID and/or password mechanisms. At this stage of the process, an isolated system that is associated with a secure inter-company collaboration environment is established.

In an embodiment, access to shared data is provided to the first and third set of utility servers, at step 810, and access to private data is provided to only the third set of utility servers, at step 812. For example, access-controlled shared data 660 (FIG. 6) is exported from external data storage 704 to data storage 710 of isolated system 700 (FIG. 7) and to data storage 310 of collaboration environment 300 (FIG. 7) and access-controlled private data 661 (FIG. 6) is exported from data storage 704 to only data storage 710, with both transfers performed via switch 702. Therefore, an individual that is associated with Company A can bring private data, such as proprietary source code, into the isolated system 700 in furtherance of efforts to debug the application associated with the source code. In conjunction with the private data, shared data associated with Company B, such as circuit modeling data that triggered an error in the execution of the application, can be brought into the isolated system 700 in order to recreate the error encountered with the application being debugged.

The foregoing processes represent, generally, a method for providing a secure system for working in isolation from an inter-company collaboration environment. Although process steps are described in a particular order in FIG. 8, embodiments of the invention are not necessarily limited to any particular order of carrying out such steps, nor are embodiments necessarily limited to carrying out every step described. Thus, implementation of the principles, techniques, and mechanisms described herein may vary considerably and still fall within the scope of the invention.

Computing System Overview

FIG. 9 is a block diagram that illustrates a computer system 900. Computer system 900, or parts thereof, may form the basis for implementations of client machines 302A, 302B and servers 308A, 308B, 708 of FIG. 7. Some of the components described in relation to computer system 900 may not be present in implementations of the foregoing systems. For example, display 912, input device 914 and cursor control 916 are not necessary for servers 308A, 308B, 708 and ISP 926 and Internet 928 are not present with server 708.

Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, optical disk, or magneto-optical disk, is provided and coupled to bus 902 for storing information and instructions.

Computer system 900 may be coupled via bus 902 to a display 912, such as a cathode ray tube (CRT) or a liquid crystal display (LCD), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical, magnetic, or magneto-optical disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, although portions of the description refer to the use of an isolated working system for debugging software and, more specifically, debugging EDA software using circuit design information, use of the system and techniques described herein are not limited to that specific context. More generally, an isolated working system associated with a secure inter-company collaboration environment may be implemented for use with any project with which some associated information is protected from one or more of the collaborative parties or companies that have access to the inter-company collaboration environment. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A system, comprising:
    an inter-company collaboration system comprising:
        a first set of one or more utility servers maintained by a first company;
        a first data storage mechanism associated with the first set of utility servers, the first data storage mechanism storing a set of execution data;
        a first set of resources residing on the first set of utility servers, wherein the first set of resources comprises an application that executes on the first set of utility servers and that operates on the set of execution data;
        a secure network connection between the first set of utility servers and a second company; and
        a first access control mechanism configured to control access, by the first company and the second company, to the first set of resources and to the secure network connection, wherein access to the first set of resources is limited to specific authorized individuals that are associated with the first company and specific authorized individuals that are associated with the second company; and an isolated system that is communicatively coupled to the collaboration system, comprising:
- a second set of one or more utility servers maintained by the first company;
- a second set of resources residing on the second set of utility servers, wherein the second set of resources comprises the application and a set of debugging resources;
- a second data storage mechanism associated with the second set of utility servers, the second data storage mechanism including:
  - a first storage portion that contains data that is shared with the collaboration system, including the set of execution data; and
  - a second storage portion that contains data that is private to the isolated system, wherein the data that is private to the isolated system includes source code associated with the application; and
- a second access control mechanism configured to control access to the second set of utility servers, wherein access to the second set of utility servers is limited to specific authorized individuals that are associated only with the first company;

wherein the application is executed on the second set of utility servers and operates on the set of execution data stored in the first storage portion of the second data storage mechanism, and wherein the set of debugging resources is used by one or more authorized individuals associated with the first company to debug the application.

2. The system of claim 1, further comprising a switching mechanism coupled to the first data storage mechanism and the second data storage mechanism, configured to control copying of the data that is shared with the collaboration system to the first and second data storage mechanisms and to control copying of the data that is private to the isolated system to only the second data storage mechanism.

3. The system of claim 1, wherein the application is an electronic design automation (EDA) application.

4. The system of claim 1, wherein the set of execution data that is shared between the collaboration system and the isolated system includes a set of data that represents an electronic design created using the application.

5. The system of claim 1, wherein the second set of resources further comprises:
a compiler for compiling the source code associated with the application.

6. A method comprising:
controlling access to a first set of one or more utility servers maintained by a first company, wherein access to the first set of utility servers is limited to authorized individuals associated with the first company and authorized individuals associated with a second company to enable the first company and the second company to collaborate using the first set of utility servers;
executing an application on the first set of utility servers, wherein the application operates on a set of execution data;
controlling access to a second set of one or more utility servers maintained by the first company, wherein access to the second set of utility servers is limited to authorized individuals associated with the first company only such that the second set of utility servers is isolated from the second company;
sharing the set of execution data between the first set of utility servers and the second set of utility servers;
executing the application on the second set of utility servers, and having the application operate on the set of execution data to recreate on the second set of utility servers one or more situations encountered on the first set of utility servers; and
debugging the application on the second set of utility servers, wherein the second set of utility servers has access to private data that is not accessible to the first set of utility servers;
wherein the private data comprises source code for the application, and wherein debugging the application comprises making one or more changes to the source code to derive a set of updated source code.

7. The method of claim 6, further comprising:
compiling the updated source code on the second set of utility servers.

8. The method of claim 6, wherein the application is an electronic design automation (EDA) application, and wherein the set of execution data represents an electronic design created using the EDA application.

9. A system comprising:
means for controlling access to a first set of one or more utility servers maintained by a first company, wherein access to the first set of utility servers is limited to authorized individuals associated with the first company and authorized individuals associated with a second company to enable the first company and the second company to collaborate using the first set of utility servers;
means for executing an application on the first set of utility servers, wherein the application operates on a set of execution data;
means for controlling access to a second set of one or more utility servers maintained by the first company, wherein access to the second set of utility servers is limited to authorized individuals associated with the first company only such that the second set of utility servers is isolated from the second company;
means for sharing the set of execution data between the first set of utility servers and the second set of utility servers;
means for executing the application on the second set of utility servers, and having the application operate on the set of execution data to recreate on the second set of utility servers one or more situations encountered on the first set of utility servers; and
means for debugging the application on the second set of utility servers, wherein the second set of utility servers has access to private data that is not accessible to the first set of utility servers;
wherein the private data comprises source code for the application, and wherein the means for debugging the application comprises means for making one or more changes to the source code to derive a set of updated source code.

10. The system of claim 9, further comprising:
means for compiling the updated source code on the second set of utility servers.

11. The system of claim 9, wherein the application is an electronic design automation (EDA) application, and wherein the set of execution data represents an electronic design created using the EDA application.

* * * * *